(12) United States Patent
Kao et al.

(10) Patent No.: US 10,767,636 B2
(45) Date of Patent: Sep. 8, 2020

(54) MULTIPLE IMPELLER TYPE POWER GENERATION TURBINE

(71) Applicants: Cheng-Yan Kao, Taichung (TW); Cheng-Jung Kao, Taichung (TW)

(72) Inventors: Cheng-Yan Kao, Taichung (TW); Cheng-Jung Kao, Taichung (TW)

(73) Assignee: LANYANG GEOTHERMAL CORP., Yilan County (TW)

( * ) Notice: Subject to any disclaimer, the term of this patent is extended or adjusted under 35 U.S.C. 154(b) by 95 days.

(21) Appl. No.: 16/106,013

(22) Filed: Aug. 21, 2018

(65) Prior Publication Data

US 2019/0390659 A1     Dec. 26, 2019

(30) Foreign Application Priority Data

Jun. 22, 2018 (TW) .............................. 107121505 A

(51) Int. Cl.
*F03G 7/04* (2006.01)
*F01K 23/02* (2006.01)

(52) U.S. Cl.
CPC ................ *F03G 7/04* (2013.01); *F01K 23/02* (2013.01); *Y02E 10/10* (2013.01)

(58) Field of Classification Search
CPC ... F03G 7/04; Y02E 10/10; F03B 1/00; F03B 1/02; F03B 1/04
See application file for complete search history.

(56) References Cited

U.S. PATENT DOCUMENTS

| 1,623,446 A | * | 4/1927 | Taylor | ...................... F03B 1/00 |
| | | | | 415/151 |
| 4,382,746 A | * | 5/1983 | Retz | .......................... F03B 1/02 |
| | | | | 415/202 |

FOREIGN PATENT DOCUMENTS

| JP | 60030477 A | * | 2/1985 | ................ F03B 1/04 |
| TW | M529066 | | 9/2016 | |
| TW | M529066 U | * | 9/2016 | |

\* cited by examiner

*Primary Examiner* — Mark A Laurenzi
*Assistant Examiner* — Xiaoting Hu

(57) ABSTRACT

A multiple impeller type power generation turbine includes a body, at least a high pressure water tank, and two impellers, two first jet assemblies and two low pressure steam chambers installed in the body. The high pressure water tank is provided for containing a working fluid coming from a fluid source. The two impellers are synchronously and rotably linked with the power generator. The two first jet assemblies is provided for ejecting the working fluid contained in the high pressure water tank to fluid inlet ends of the two impellers and guiding the working fluid from the fluid outlet ends to the two low pressure steam chambers to drive the power generator to generate electric power, so s to improve the power generation efficiency and modularization and the convenience of installation and maintenance.

14 Claims, 7 Drawing Sheets

MULTIPLE IMPELLER TYPE POWER GENERATION TURBINE

FIELD OF THE INVENTION

The present invention relates to a multiple impeller type power generation turbine, and more particularly to the power generation turbine capable of improving its power generation efficiency and modularization, so as to improve the convenience of installation and maintenance.

BACKGROUND OF THE INVENTION

Geothermal power generation specially catches the attention of the government and related industries of a country or district with rich geothermal resources. Compared with the conventional power generations such as solar and offshore wind power generations, the geothermal power generation has higher power generation efficiency and cost-effectiveness. In addition, the geothermal power has the feature of stable power supply and thus may serve as a baseload electric power. Especially, Taiwan and many other districts with rich geothermal resources can generate power with a lower total cost and overcome the problem of electric power shortage effectively. The geothermal power generation gradually replaces the nuclear or thermal power generation and reduces the emission of greenhouse gases to provide a better chance for sustainable human survival and development.

Geothermal fluids in many locations are situated at a status of appropriate working pressure and high stability. When the geothermal fluid reaches the Earth's surface, the outlet end pressure in a pipe flow maintains the geothermal fluid in two phases (saturated steam or over-saturated steam) in a compressible fluid state, and the geothermal fluid gushes out in a form of wet vapor which provide a sufficient working stability. Less than 5% of the world's geothermal fields produce dry steam directly. Although many districts have rich geothermal resources, yet most of them produce relatively low-temperature wet vapor geothermal fluid below 200° C., and the steam in the working fluid is below 20%. Therefore, finding a way of generating electric power by a wet vapor geothermal fluid effectively demands immediate attention and feasible solutions. Geothermal power generation definitely plays an important role in future energy autonomy and green economy.

According to the development in different countries and districts in the past two decades, the design of geothermal power generation plants is divided by the temperature of the geothermal fluid, and the geothermal power of a generation power generation facility is mainly divided by the temperature and the water-vapor state of a geothermal source into a dry steam type, a flash steam type, and a double-cycle type. Although the conventional dry steam type, flash steam type, and Organic Rankine Cycle (ORC) geothermal power generation system can accept the geothermal source (such as hot water, steam or vapor-liquid phased working fluid) to drive a turbine or expansion screw to link a power generator to generate electric power. However, the conventional geothermal power generation systems still has the following deficiencies that require further improvements: 1. For example, most of the geothermal resources in Taiwan are mixed fluid (hot water vapor and hot water) type wet vapor geothermal field, and the turbine of the conventional geothermal power generation system is not designed optimally with the features of such geothermal field. Although the flash geothermal power generation system may flash a portion of hot water into steam, only a general steam turbine is provided for bearing the drive of steam, and most of the non-flash hot water cannot be used for the power generation, thus resulting in a poor thermal efficiency and reducing the geothermal power generation efficiency. 2. Since the geothermal power generation systems only has one set of hot source spout, the geothermal fluid cannot be erupted effectively and uniformly to each blade of the turbine, and the mechanical efficiency of the turbine is reduced to lower the geothermal power generation efficiency. 3. The wet vapor geothermal fluid mixed with hot water vapor cannot be used completely. For example, the flash geothermal power generation system can just be used for pushing the turbine to push the steam and re-eject a large quantity of non-flash hot water, and the double-cycle type geothermal power generation system requires a heat exchanger and uses an expansion screw or an air turbine to withstand the drive of the gaseous working fluid in order to drive the power generator to generate electric power, and thus the heat exchanger loses much usable energy.

In view of the aforementioned drawbacks of the prior art, the inventor of the present invention based on years of experience to conduct extensive research and experiment, and finally provided a feasible solution to overcome the drawbacks of the prior art.

SUMMARY OF THE INVENTION

Therefore, it is a primary objective of the present invention to provide a multiple impeller type power generation turbine with the feature of modularization and a plurality of impellers to effectively improve the power generation efficiency. To achieve this objective, the present invention provides a multiple impeller type power generation turbine comprising a body, at least a high pressure water tank, and two impellers, two first jet assemblies and two low pressure steam chambers installed in the body. The two first jet assemblies are provided for ejecting a working fluid contained in the high pressure water tank to a fluid inlet end of each of the two impellers and guiding the working fluid from a fluid outlet end to two low pressure steam chambers in order to drive the two impellers to rotate synchronously and to drive the operation of the power generator to generate electric power.

A secondary objective of the present invention is to provide a multiple impeller type power generation turbine with a turbine deceleration function, so that if the power generator is overloaded or loses control, a resistance will be provided to decelerate the rotating impellers, so s to reduce the rotating speed of the power generator and prevent damages of the power generator due to over-speed or overload. To achieve this objective, the present invention provides a power generation turbine comprising the aforementioned elements (the body, at least a high pressure water tank, two impellers, two first jet assemblies and two low pressure steam chambers) and further comprising a turbine deceleration control module for controlling the deceleration of the two impellers and the power generator.

DESCRIPTION OF THE PREFERRED EMBODIMENTS

Figure 1:
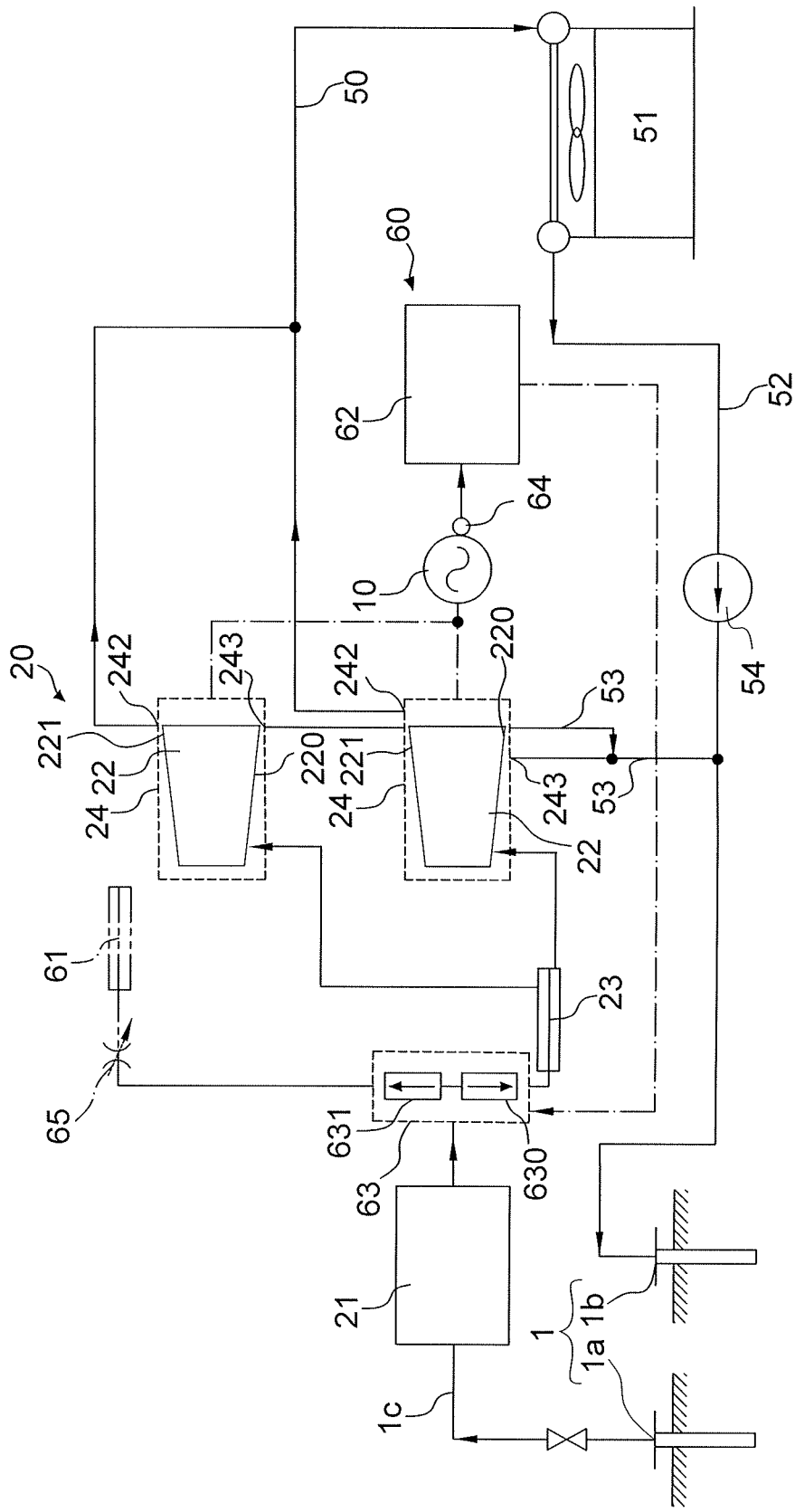
FIG. 1 is a schematic circuit diagram showing the operation of generating power by a working fluid in accordance with the present invention.

With reference to FIGS. 1 to 4 for a multiple impeller type power generation turbine in accordance with a first embodiment of the present invention, the multiple impeller type power generation turbine 2 comprises a body 20, and a high pressure water tank 21, two impellers 22, two first jet assemblies 23 and two low pressure steam chambers 24 disposed in the body. The high pressure water tank 21 is provided for containing a working fluid formed by a fluid source 1 (such as a high pressure steam, and a two-phase mixed hot water or hot water vapor fluid obtained from a geothermal production well). The high pressure water tank 21 is disposed between the two impellers 22. The two impellers 22 are disposed between the two low pressure steam chambers 24. The two first jet assemblies 23 are disposed between the two impellers 22. The two impellers 22 are in the same shape, coaxially and anti-symmetrically installed at a main shaft 30, and synchronously and rotably linked to the power generator 10, so that the directions for ejecting the working fluid from the two first jet assemblies 23 to the two impellers 22 are opposite but the flows of the working fluid are the same. Each of the two impellers 22 includes a fluid inlet end 220 and a fluid outlet end 221. The two first jet assemblies 23 are installed on the high pressure water tank 21 and communicated with the high pressure water tank 21. The two first jet assemblies 23 are installed at the relative positions of the fluid inlet ends 220 of the two impellers 22 respectively. The two low pressure steam chamber 24 are installed at the relative positions of the fluid outlet ends 221 of the two impellers 22 respectively. The two first jet assemblies 23 are provided for ejecting the working fluid in the high pressure water tank 21 to the fluid inlet ends 220 of the two impellers 22 and guiding the working fluid from the fluid outlet ends 221 to the two low pressure steam chambers 24 respectively to drive the two impellers 22 to rotate synchronously and drive the operation of the power generator 10 to generate electric power. Preferably, the first jet assembly 23 has a plurality of orifices 230 axially and circularly arranged with respect to the main shaft 30. The orifices 230 are configured to be corresponsive to the impeller 22 and the fluid inlet ends 220. The main shaft 30 is coupled to the power generator 10 through a reduction gear set 11 and a coupler 12 and mounted onto a base 40. The high pressure water tank 21 is in a cylindrical shape with a through hole 211 formed at the center and provided for passing the main shaft 30.

In FIGS. 1 to 4, the top and bottom of the two low pressure steam chambers 24 are communicated with an upper channel 240 and a lower channel 241 respectively. The upper channel 240 has an exhaust channel 242 for discharging a working fluid in vapor state and passing through the two impellers 22 after work out from the exhaust channel 242. The lower channel 241 has a drainage channel 243 for discharging a working fluid in liquid state and passing through the two impellers 22 after work out from the drainage channel 243.

Figure 2:
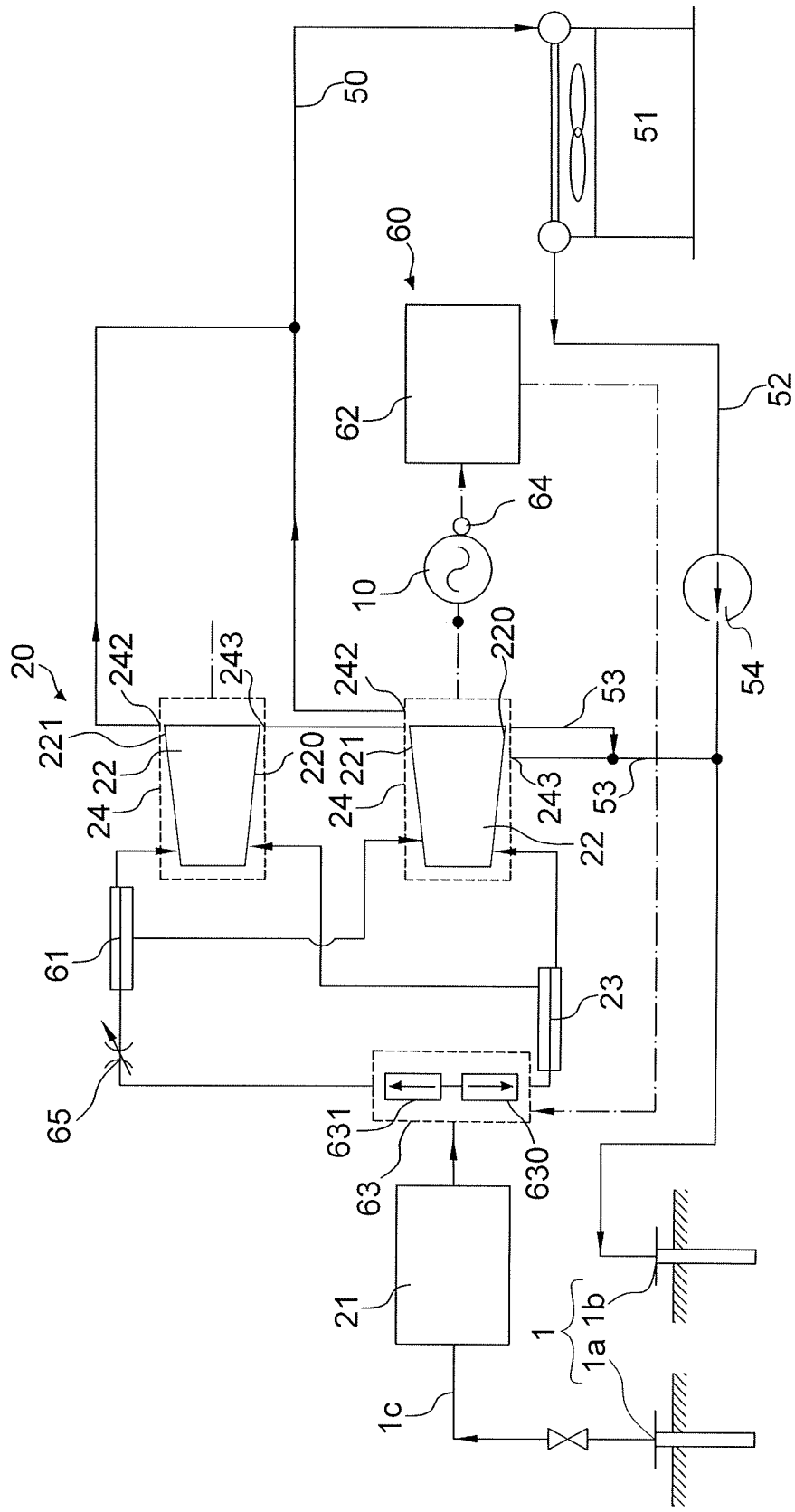
FIG. 2 is a schematic circuit diagram showing the deceleration of a working fluid during the power generation in accordance with the present invention.

In FIGS. 1 and 2, the exhaust channel 242 is communicated with a condensation pipeline 50. The condensation pipeline 50 has a condenser 51 installed thereon and an end of the condensation pipeline is communicated with a return pipeline 52. The condenser 51 is provided for cooling and condensing the working fluid in liquid state after work. The drainage channel 243 is communicated with the return pipeline 54 through a conduit 53. An end of the return pipeline 52 is communicated with a geothermal injection well 1b. The return pipeline 52 has a pump 54 for pressurizing and returning the working fluid in liquid state (which is waste hot water) discharged from the condensation pipeline 50 and the conduit 53 into the geothermal injection well 1b.

In FIGS. 1 and 2, the fluid source 1 is a geothermal production well 1a. The geothermal production well 1a is communicated with an end of a supply pipeline 1c, and the other end of the supply pipeline 1c is communicated with the high pressure water tank 21 for using the steam, hot water or two phased hot water vapor geothermal fluid obtained from the geothermal production well 1a as the working fluid and sending the geothermal fluid to the high pressure water tank 21. Therefore, the multiple impeller type power generation turbine of the present invention can be applied effectively to various types of geothermal power generation equipment including the dry steam type, flash steam type, and double-cycle type to maximize the power generation efficiency.

In FIGS. 1 to 4, the multiple impeller type power generation turbine 2 further comprises a turbine deceleration control module 60 for controlling the deceleration of the two impellers 22. The two first jet assemblies 23 inject the working fluid in the high pressure water tank 21 to the fluid inlet ends 220 of the two impellers 22 and guide the working fluid out from the fluid outlet ends 221. In general, each fluid inlet end 220 of the impeller 22 is the front side (or concave side of the blade) that drives the two impellers 22 to synchronously accelerate the rotation to drive the operation of the power generator 10 to generate electric power.

Figure 3:
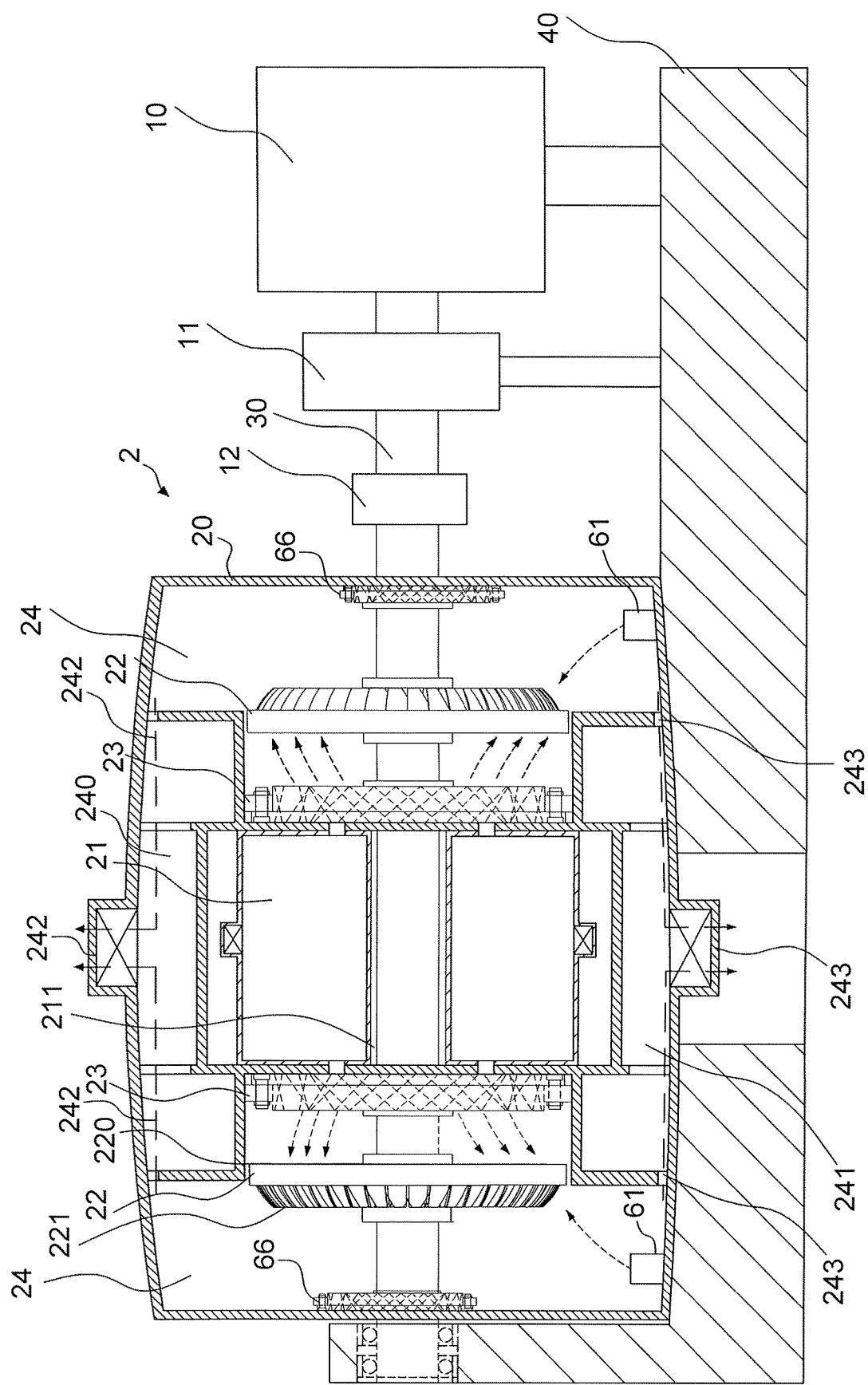
FIG. 3 is a schematic view of a first embodiment of the present invention in a speed adjusting status.
Figure 4:
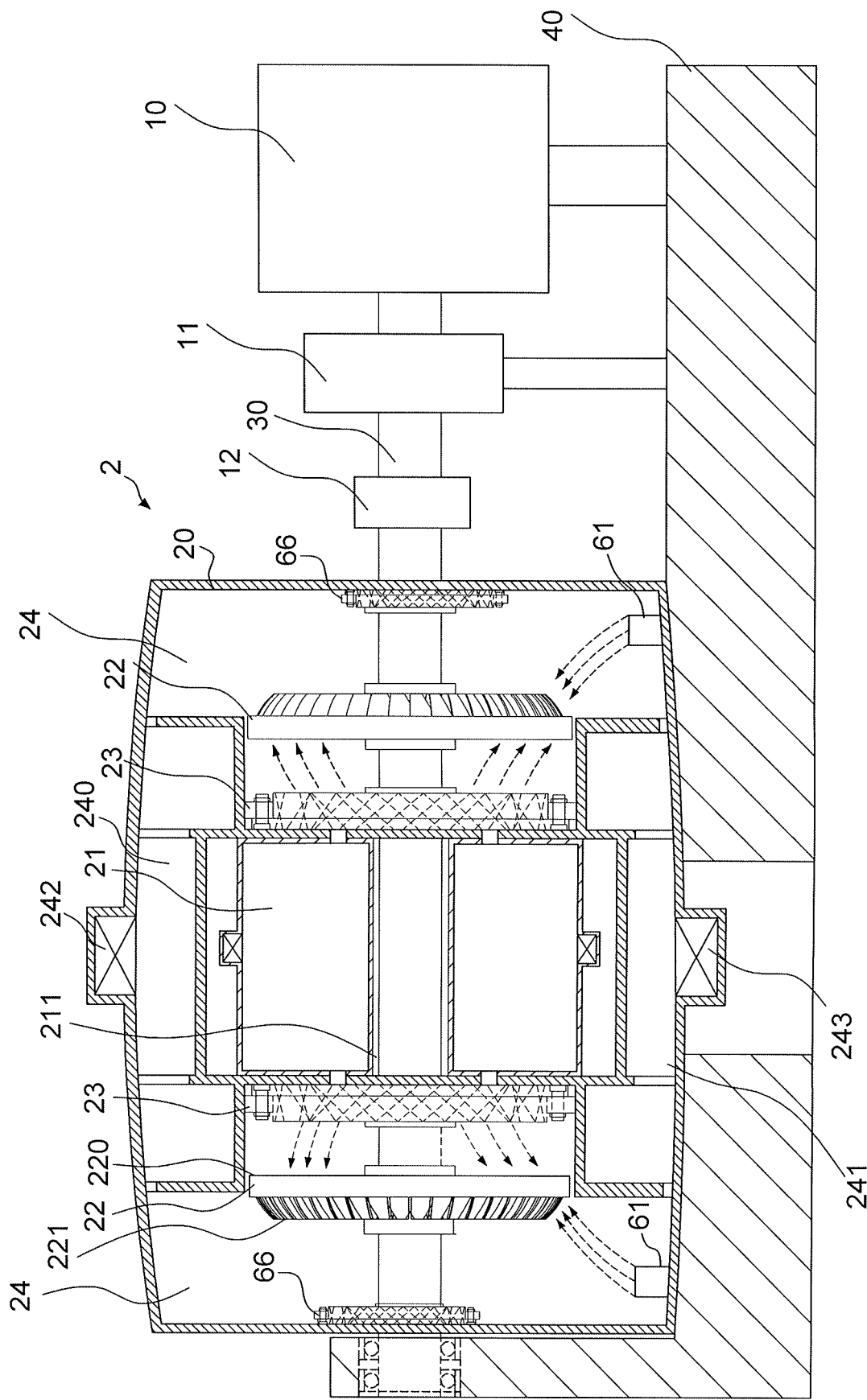
FIG. 4 is a schematic view of the first embodiment of the present invention in a significant deceleration status.

In FIGS. 1 and 2, the turbine deceleration control module 60 comprises two second assemblies 61, a control unit 62 and a control valve module 63. The control valve module 63 includes a first control valve 630 and a second control valve 631. The second control valve 631 is controlled by the control unit 62 to connect or disconnect the channel between the fluid source 1 and the two second assemblies 61. The first control valve 630 is controlled by the control unit 62 to connect or disconnect the channel between the fluid source 1 and the two first jet assemblies 23. The two second assemblies 61 are disposed at relative positions of the fluid outlet ends 221 and the two impellers 22 (which are disposed in the two low pressure steam chambers 24 as shown in FIGS. 3 and 4). If the second control valve 631 is opened, the two second assemblies 61 will inject the working fluid of the fluid source 1 (acting as a resisting fluid) to the fluid outlet ends 221 of the two impellers 22 to provide resistance for decelerating the two impellers 22. If the first control valve 630 is closed, the channel between the fluid source 1 and the two first jet assemblies 23 will be disconnected, so that the multiple impeller type power generation turbine 2 will be shut down.

In an embodiment as shown in FIGS. 1 and 2, the control unit 62 uses the control valve module 63 to control the timing for the first jet assembly 23 and the second jet assembly 61 to eject the working fluid coming from the fluid source 1.

In FIGS. 3 and 4, both of the two low pressure steam chambers 24 have a rotatable water spinning disc 66 (mounted on the main shaft 30 as shown in the figures) for blocking the working fluid such as the waste hot water passing through the two impellers 22 after work, and guiding and discharging the working fluid from the drainage channel 243 under the low pressure steam chamber 24.

In FIGS. 1 and 2, the power generation turbine further comprises a sensing module 64 (such as a current feedback circuit, a voltage feedback circuit, or a tachometer) for sensing the rotating speed, output voltage or output current of the power generator 10, and the voltage generates at least a sensing signal. The control unit 62 processes the sensing signal and converts the sensing signal into a sensed value (such as the value of voltage, current, or rotating speed). If the sensed value exceeds a default value, then the turbine deceleration control module 60 will be turned on to control the deceleration of the two impellers 22.

In FIGS. 1 and 2, the power generation turbine further comprises a flow control valve 65 communicated with the channel of the second control valve 631. The flow control valve 65 is provided for regulating the quantity of the ejected working fluid (which is the resisting fluid in this case) of the two second assemblies 61. If the sensed value is below the default value, (indicating a safe status with a normal rotating speed of the power generator), the control unit 62 will open the first control valve 630 and the second control valve 631 and will shut the flow control valve 65. If the sensed value exceeds the default value, (indicating an alert status with a too-fast rotating speed of the power generator), the control unit 62 will open the flow control valve 65, so that the two second assemblies 61 eject less resisting fluid (which is the working fluid coming from the fluid source 1 as shown in the figures) to the fluid outlet ends 221 of the two impellers 22. If the sensed value exceeds or reaches a second default value higher than the aforementioned default value (indicating an alert status with a too-fast rotating speed of the power generator and there may be a risk of burning or damage), or it is necessary to shut down the power generation turbine, the control unit 62 will close the first control valve 630 and open the flow control valve 65 to drive the two second assemblies 61 to eject more working fluid (which is the resisting fluid in this case) to the fluid outlet ends 221 of the two impellers 22, so that the two impellers 22 decelerate more quickly until the rotation stops. Now, the control unit 62 will close the second control valve 631 and flow control valve 65 again to complete the shutdown procedure.

Figure 5:
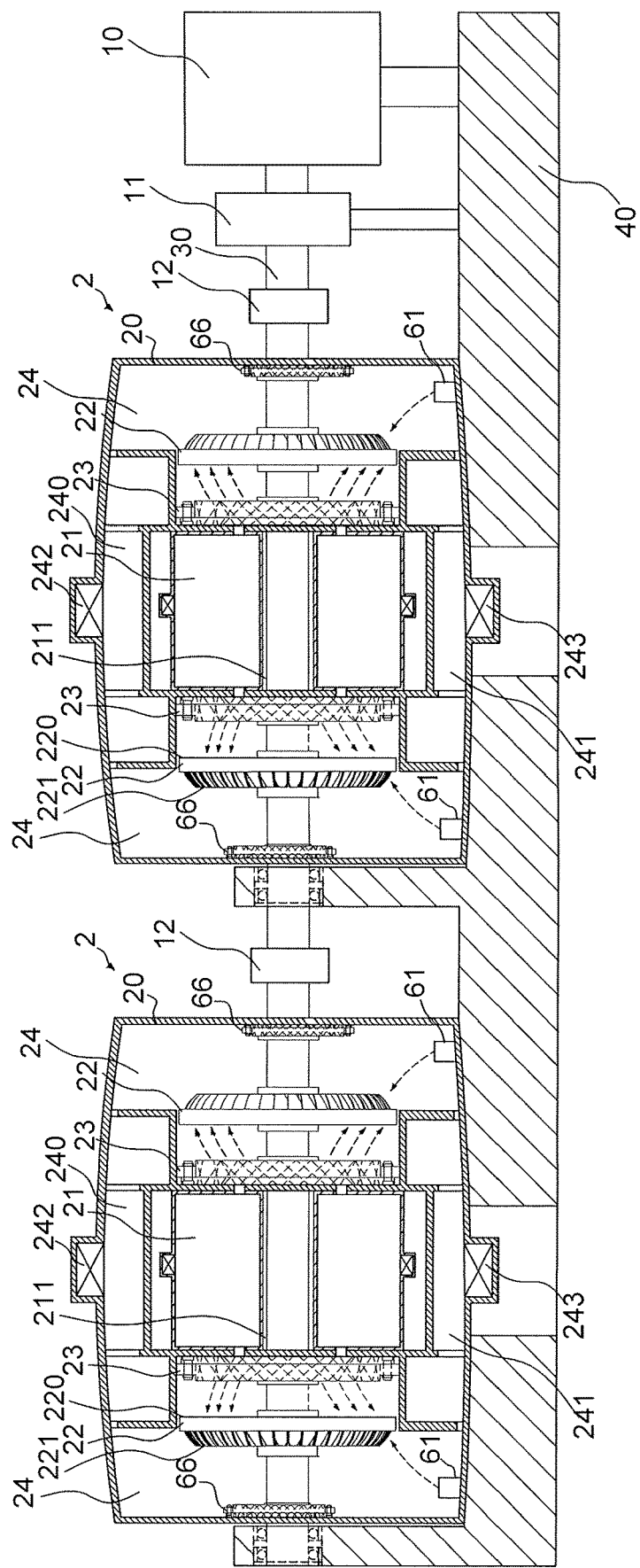
FIG. 5 is a schematic view of two sets of multiple impeller type power generation turbines serially connected with each other in accordance with the present invention.

With reference to FIG. 5 for an application of the present invention, several main shafts 30 of the multiple impeller type power generation turbines 2 may be serially linked by a coupler 12 and at least one power generator 10 is coaxially and serially coupled to the base 40 for selectively assigning a plurality of multiple impeller type power generation turbines 2 to drive the power generator 10 to generate electric power, so as to improve the power generation efficiency effectively by fitting the status of the thermal energy of the working fluid.

Figure 6:
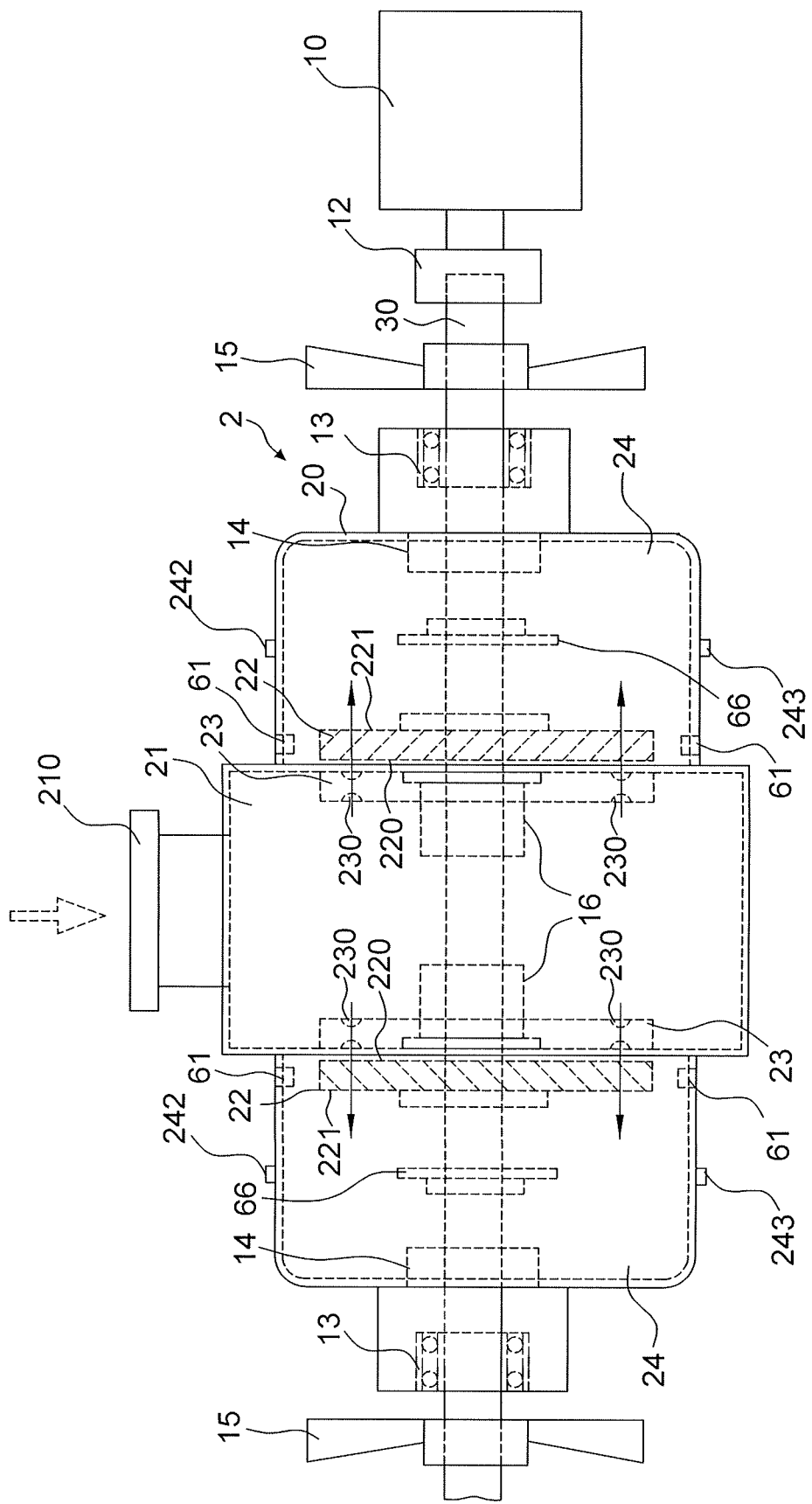
FIG. 6 is a schematic view of a second embodiment of the present invention.

With reference to FIGS. 2 and 6 for a multiple impeller type power generation turbine in accordance with a second embodiment of the present invention, the multiple impeller type power generation turbine 2 comprises a high pressure water tank 21, two impellers 22 and two low pressure steam chambers 24 disposed in in the body 20. The high pressure water tank 21 is disposed between the two impellers 22. The two impellers 22 are disposed between the two low pressure steam chambers. The two first jet assemblies 23 are disposed at both ends of the high pressure water tank 21 respectively and between the two impellers 22, and opposite to the fluid inlet ends 220 of the two impellers 22. The two impellers 22 are anti-symmetrically mounted onto the main shaft 30. The power generator 10 is serially coupled to the main shaft 30 through the coupler 12. Both ends of the main shaft 30 have a bearing seat 13 and a fan 15. The top of the high pressure water tank 21 has a water inlet end 210 for inputting a working fluid from a fluid source 1. The inner sides of the two bearing seats 13 are extended into the two low pressure steam chambers 24 for pivotally coupling the main shaft 30, and each main shaft 30 is sheathed with a first shaft seal 14. Each main shaft 30 in the two low pressure steam chambers 24 has a water spinning disc 66. A second jet assembly 61 is installed at a position proximate to the top and the bottom of the fluid outlet end 221 of the two impellers 22 for braking or deceleration. The water spinning disc 66 is driven and rotated by the main shaft 30 to block the working fluid (which is the waste hot water) passing through the two impellers 22 after work and guide the working fluid to the drainage channel 243 under the low pressure steam chamber 24. The main shaft 30 drives a fan 15 to cool the two sets of bearing seats 13. The two first jet assemblies 23 of the high pressure water tank 21 have two respective second shaft seal 16 facing the ends of the main shaft 30 respectively. The two impellers 22 are disposed at an end positon inside the two low pressure steam chambers 24 and opposite to the first jet assembly 23. Since the adjacent sidewalls of the high pressure water tank 21 and the two low pressure steam chambers 24 have communicated pores, the two first jet assemblies 23 can eject the working fluid to the fluid inlet ends 220 of the two impellers 22 effectively.

Figure 7:
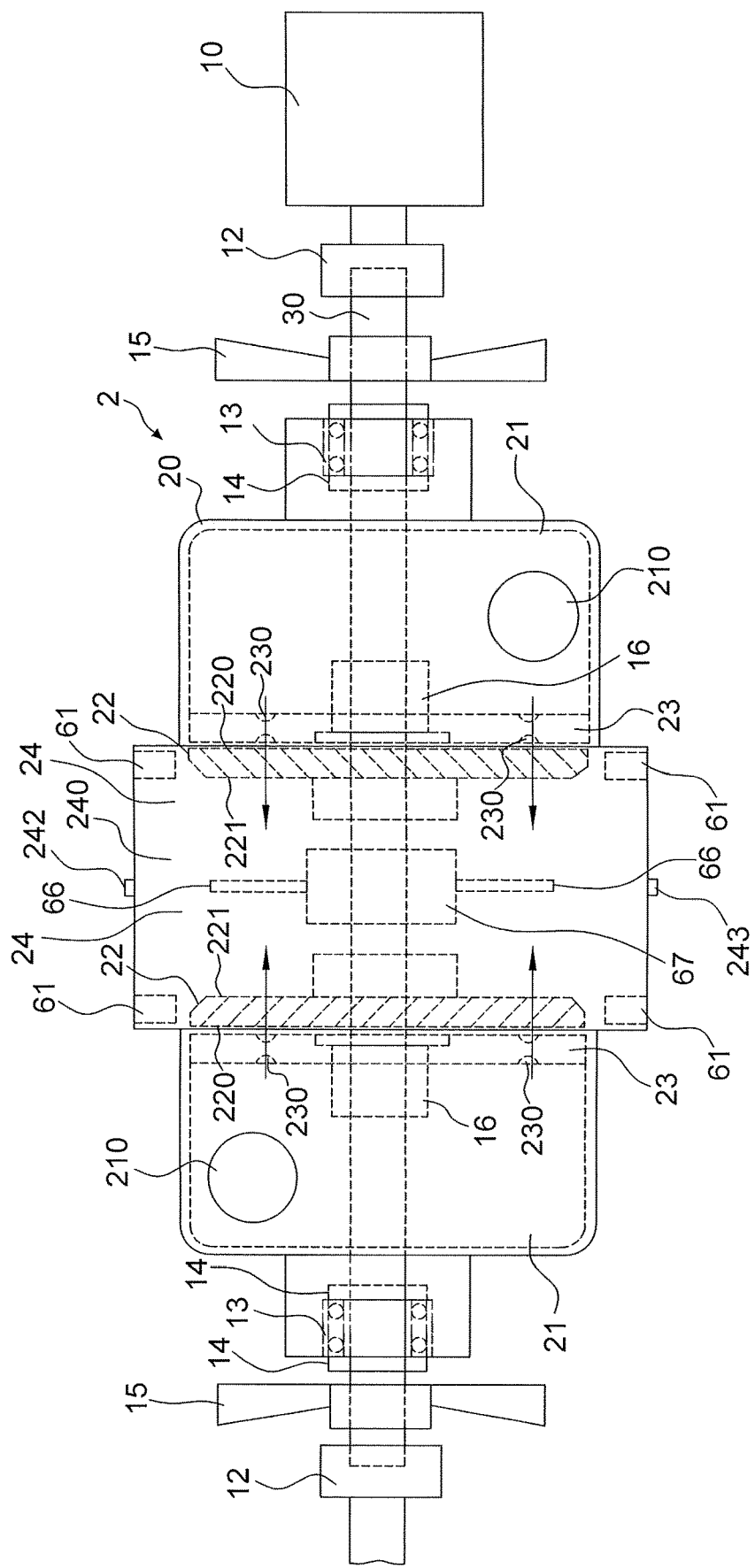
FIG. 7 is a schematic view of a third embodiment of the present invention.

With reference to FIGS. 2 and 7 for a multiple impeller type power generation turbine in accordance with a third embodiment of the present invention, the multiple impeller type power generation turbine 2 comprises two high pressure water tanks 21, two impellers 22 and two low pressure steam chambers 24 disposed in the body 20. The two first jet assemblies 23 are disposed on the two high pressure water tanks 21 respectively. The two impellers 22 are disposed between the two high pressure water tanks 21 and the two first jet assemblies 23. The two low pressure steam chambers 24 are disposed between the two impellers 22. The two low pressure steam chambers 24 are communicated with each other to form a large low pressure steam chamber 240. The two impellers 22 are mounted onto a main shaft 30. The power generator 10 is serially coupled to the main shaft 30 through the coupler 12. Both ends of the main shaft 30 have a bearing seat 13 and a fan 15 respectively. Both sides of the bearing seat 13 have a first shaft seal 14. The fan 15 is provided for cooling the bearing seat 13. The fluid inlet ends 220 of the two impellers 22 are respectively and precisely aligned with the two first jet assemblies 23, and the fluid outlet ends 221 are aligned precisely with the low pressure steam chamber 24. The two high pressure water tanks 21 have water inlet ends 210 for inputting the working fluid of the fluid source 1. The low pressure steam chamber 24 has a second jet assembly 61 (disposed at a position proximate to both of the top and bottom of each impeller 22 and used for braking or deceleration, and the second jet assembly 61 is generally a throttle valve provided for adjusting the speed). The main shaft 30 of the large low pressure steam chamber 240 is sheathed with a flywheel 67. A water spinning disc 66 is installed around the periphery of the flywheel 67. The water spinning disc 66 is driven and rotated by the main shaft 30 to block the working fluid (which is waste hot water in this case) passing through the two impellers 22 after work and guide the working fluid to the drainage channel 243 under the low pressure steam chamber 24. A second shaft seal 16 is installed to a position of an outwardly extended end of the main shaft 30 of each of the two sets of first jet assemblies 23 in the two high pressure water tanks 21. The two impellers 22 are anti-symmetrically installed at both ends inside the low pressure steam chamber 24 respectively. Since there are communicated pores formed between adjacent sidewalls of the two high pressure water tanks 21 and the low pressure steam chamber 24, therefore the two first jet assemblies 23 can be used for ejecting the working fluid contained in the two high pressure water tanks 21 to the fluid inlet ends 220 of the two impellers 22.

While we have shown and described the embodiment in accordance with the present invention, it should be clear to those skilled in the art that further embodiments may be made without departing from the scope of the present invention.

What is claimed is:

1. A multiple impeller type power generation turbine, comprising:
   at least one high pressure water tank, for containing a working fluid obtained from a fluid source;
   two impellers, coaxially installed onto a main shaft, and linked to at least one power generator, and each of the two impellers including a fluid inlet end and a fluid outlet end;
   two first jet assemblies, communicated with the at least one high pressure water tank and installed at relative positions of the fluid inlet ends of the two impellers respectively, and the two first jet assemblies being provided for ejecting the working fluid contained in the at least one high pressure water tank at a high speed towards the fluid inlet ends of the two impellers and guiding the working fluid out from the fluid outlet ends, so as to drive the two impellers to synchronously rotate the at least one power generator to generate electric power;
   two low pressure steam chambers, disposed at relative positions of the fluid outlet ends of the two impellers respectively, for receiving the working fluid guided out from the fluid outlet ends; and
   a body, for installing the two impellers, the two first jet assemblies and the two low pressure steam chambers therein; wherein the at least one high pressure water tank is in a substantially cylindrical shape and is disposed in the body, and the at least one high pressure water tank has a through hole formed at a center of the at least one high pressure water tank for passing the main shaft.

2. The multiple impeller type power generation turbine of claim 1, wherein the two impellers are disposed between the two low pressure steam chambers.

3. The multiple impeller type power generation turbine of claim 2, wherein the at least one high pressure water tank includes a single high pressure water tank, and the high pressure water tank is installed in the body and disposed between the two impellers, and the two first jet assemblies are installed onto the high pressure water tank and disposed between the two impellers.

4. The multiple impeller type power generation turbine of claim 1, wherein the two low pressure steam chambers are disposed between the two impellers.

5. The multiple impeller type power generation turbine of claim 4, wherein the at least one high pressure water tank includes two high pressure water tanks, the two high pressure water tanks are installed in the body, the two first jet assemblies are installed onto the two high pressure water tanks respectively, and the two impellers are disposed between the two high pressure water tanks and the two first jet assemblies.

6. The multiple impeller type power generation turbine of claim 4, wherein the two low pressure steam chambers are communicated to each other to form a large low pressure steam chamber.

7. The multiple impeller type power generation turbine of claim 1, wherein the fluid source is a geothermal production well, and the working fluid is a steam, hot water, or two phased hot water vapor fluid obtained from the geothermal production well; each of the two low pressure steam chambers includes a drainage channel and an exhaust channel; the drainage channel is provided for discharging the working fluid in a liquid state and passing through the two impellers to a geothermal injection well; the exhaust channel is provided for discharging the working fluid in a vapor state and passing through the two impellers to a condenser and sending the working fluid after cooling to the geothermal injection well, and a pump is provided for accelerating the working fluid to flow towards the geothermal injection well.

8. The multiple impeller type power generation turbine of claim 1, further comprising at least one water spinning disc rotatably installed in a position configured to be corresponsive to the two low pressure steam chambers for blocking the working fluid in a liquid state and passing through the two impellers, and guiding the working fluid to be discharged from drainage channels of the two low pressure steam chambers.

9. The multiple impeller type power generation turbine of claim 1, further comprising two second jet assemblies and a control unit; the two second jet assemblies are disposed at relative positions of the fluid outlet ends of the two impellers; wherein the control unit is configured to control a second control valve to open so that channels of the two second jet assemblies are opened to eject a resisting fluid to the fluid outlet ends of the two impellers so as to provide resistances for decelerations of the two impellers.

10. The multiple impeller type power generation turbine of claim 9, further comprising a flow control valve for controlling a flow at the channels of the two second jet assemblies.

11. The multiple impeller type power generation turbine of claim 9, further comprising a first control valve; the resisting fluid is the working fluid coming from the fluid source; wherein when the first control valve is controlled and closed by the control unit, a channel between the fluid source and the two first jet assemblies is disconnected.

12. The multiple impeller type power generation turbine of claim 9, further comprising a sensing module configured to sense a rotating speed, an output voltage or an output current of the power generator to generate at least a sensing signal, the control unit processes and converts the sensing signal into a sensed value, and wherein when the sensed value exceeds a default value, the control unit controls the second control valve to open so that channels of the two second jet assemblies are opened.

13. The multiple impeller type power generation turbine of claim 1, wherein each of the two first jet assemblies has a plurality of orifices axially arranged around the main shaft and circularly arranged with respect to the respective impeller and fluid inlet end.

14. The multiple impeller type power generation turbine of claim 1, wherein the two impellers are in the same shape and anti-symmetrically mounted onto the main shaft.

\* \* \* \* \*